United States Patent [19]

Bianco

[11] Patent Number: 4,824,685

[45] Date of Patent: Apr. 25, 1989

[54] METHOD AND APPARATUS FOR CONTROLLING THE RIPENING OF FRESH PRODUCE

[75] Inventor: Michael Bianco, Miami, Fla.

[73] Assignee: Del Monte Fresh Fruit Company, Miami, Fla.

[21] Appl. No.: 86,275

[22] Filed: Aug. 17, 1987

[51] Int. Cl.$^4$ .......................... A23B 7/144; A23L 1/00
[52] U.S. Cl. ........................................ 426/418; 98/36; 99/474; 426/419
[58] Field of Search .................. 426/418, 419; 99/467, 99/474; 62/414, 419, 329; 98/6, 36

[56] References Cited

U.S. PATENT DOCUMENTS

| | | | |
|---|---|---|---|
| 1,736,788 | 8/1926 | Huston | 62/414 |
| 1,939,957 | 11/1931 | Day | 98/7 |
| 2,079,304 | 5/1937 | Polderman | 426/419 |
| 2,279,847 | 10/1940 | Stebbins | 62/414 |
| 3,008,838 | 4/1954 | Brunsing et al. | 426/419 |
| 3,123,988 | 1/1962 | Richmam | 62/414 |
| 4,354,549 | 9/1979 | Smith | 165/62 |
| 4,426,923 | 1/1984 | Ohata | 99/468 |
| 4,566,377 | 6/1984 | Van Buytene | 99/474 |
| 4,676,152 | 6/1987 | Tsuji et al. | 99/474 |

OTHER PUBLICATIONS

"Commercial Cooling of Fruits and Vegetables" by F.G. Mitchell, Rene Guillou and R.A. Parsons (University of California 1972) pp. 8, 14–19.

Primary Examiner—George Yeung
Attorney, Agent, or Firm—Richard Kornutik

[57] ABSTRACT

The disclosure is related to a method and apparatus for controlling the ripening of fresh produce, particularly the ripening of fresh fruit such as bananas. The fresh produce is arranged into a palletized load which is inserted into a ripening chamber. The palletized load is arranged into two spaced rows, each of said rows including two vertically spaced tiers to maximize the total amount of produce to be processed for the given floor space of the ripening chamber. A low pressure plenum is formed between the two rows of palletized produce by sealing the space between the rows and the vertical space between the two tiers. A controlled fluid flow is introduced around the palletized produce load and fluid is exhausted from the low pressure plenum to create a pressure differential across the produce load such that the introduced fluid is forced to flow from the space around the produce load, uniformly through the produce load and into the low pressure plenum. The uniform fluid flow is utilized to control the ripening of the inserted produce load.

22 Claims, 8 Drawing Sheets

METHOD AND APPARATUS FOR CONTROLLING THE RIPENING OF FRESH PRODUCE

BACKGROUND OF THE INVENTION

The invention is directed to a method and apparatus for controlling the ripening of fresh produce, particularly fresh fruit such as bananas.

Bananas and other fresh produce are typically transported from the growing fields to a processing facility where they are placed in specially designed ripening rooms. Such ripening rooms are provided with insulated, gas tight wall and roof panels and include an air handling unit to control the circulation and temperature of the air within the ripening room. In this manner, the ripening of the fresh produce may be controlled in accordance with a predetermined ripening schedule such that the fruit is properly ripened at the time it is scheduled for delivery to retail outlets. To advantage, ethylene gas is dispersed into the room at a preselected time to facilitate a uniform ripening of the produce. Accordingly, the use of ripening rooms enables the delivery of high quality produce to retail outlets without the constraint of having to schedule delivery in accordance with the natural ripening process of the fruit and further obviates problems associated with accelerations and decelerations of the ripening process due to changing conditions during the transportation of the produce.

In one advantageous prior ripening room arrangement, the produce is packed into unitized shipping modules comprising individual protective boxes which are block-stacked on pallets. The palletized produce is inserted into a ripening chamber having a floor, ceiling and front, rear and side walls and being of suitable dimensions to enclose two spaced rows of the palletized produce. The two rows are spaced apart from one another within the chamber to define an intersitial volume between the rows which substantially forms a low pressure plenum. There is also provided sufficient spacing between the palletized produce and the ceiling and walls of the chamber to define a high pressure air space around and above the inserted produce load.

A tarp arrangement is placed over the top and one end of the spacing between the two rows of palletized produce to seal off the low pressure plenum from the high pressure air space. Exhaust fans are arranged in a sealed relation at the opposite end of the spacing between the rows to withdraw air from the spacing and thereby create a pressure differential between the tarp sealed plenum and the high pressure air space. The air introduced by the air handling unit is forced by the pressure differential between the high pressure air space and the low pressure plenum to flow through openings formed in the sides of the boxes, around the produce contained therein and into the low pressure plenum to be exhausted by the fans. In this manner, a forced air circulation is caused to flow uniformly throughout the produce load in the chamber to thereby uniformly control the temperature of the produce with a minimal temperature differential throughout the produce load. The temperature and flow rate of the air introduced into the chamber by the air handling unit may be accurately controlled to achieve a desired ripening rate for the produce.

SUMMARY OF THE INVENTION

It is a primary objective of the present invention to provide an improved pressurized rippening system of the above-described type by substantially increasing the amount of produce which may be processed for a given amount of floor space without any sacrifice in the control and accuracy of the preselected produce temperature. More specifically, the rippening system of the invention generally comprises a cooling chamber having a floor and ceiling and front, rear and side walls and being of suitable dimensions to enclose two, two-tiered rows of unitized and palletized produce. As in the previous system, the two rows are spaced apart from one another to define an intersitial volume between the rows which substantially forms a low pressure plenum. There is also sufficient spacing between the chamber ceiling and walls and the inserted palletized produce to define an intersitial volume which forms a high pressure, air plenum.

Pursuant to an important feature of the invention, a frame structure is arranged within the chamber to provide a guide means to position the palletized produce upon insertion into the chamber into the two spaced, plenum-forming rows and to support the second tier of palletized produce directly above the first tier of palletized produce. The support function of the frame structure prevents damage to the protective boxes of the palletized produce of the first, lower tier. Such protective boxes are typically used to unitize and protect the palletized produce. The frame structure is also arranged and configured relative to the side walls of the chamber to position the inserted two tiers of palletized produce at positions which are spaced inwardly from each of the side walls of the chamber for forced air circulation from the high pressure air plenum, through the unitized, palletized produce and into the low pressure plenum, as will appear.

The chamber is provided with an interior false wall structure arranged within the chamber and spaced inwardly from the chamber rear wall to define an intersitial volume between the false wall structure and the chamber rear wall. The last mentioned intersitial volume forms an air return plenum in fluid communication with each of the low pressure plenum and the high pressure, air plenum to provide a continuous air circulation loop within the chamber. The interior wall structure supports an air handling unit closely adjacent to the ceiling of the chamber to provide a source of controlled pressurized air flow into the high pressure, air plenum and further supports a plurality of high performance exhaust blowers to draw air out of the low pressure plenum and into the return air plenum. In this manner, a pressure differential is created between the high pressure, air plenum and the low pressure plenum to provide a forced air circulation within the chamber.

In accordance with another significant feature of the invention, a ceiling tarp and an end tarp are conformed to the surfaces of the palletized produce opposite the ceiling and front wall of the chamber, respectively, to separate the low pressure plenum between the two rows of palletized produce from the high pressure, air plenum between the top and sides of the two rows of palletized produce and the ceiling of the chamber. The present two-tier system contemplates a tarp arrangement which completely covers the top and end of the palletized produce. This arrangement increases the pressure differential across the sides of the two tiers of the palletized produce to improve the forced air flow through the produce load perpendicular to the longitudinal axis of the low pressure plenum and thereby better direct and control the pressurized air flow from the air handling unit to flow directly through openings formed in the sides of the boxes of the unitized, palletized produce and into the low pressure plenum.

As discussed above, the frame structure guides the palletized produce upon insertion into the chamber to positions which are spaced inwardly from the side walls of the chamber to facilitate air circulation through the palletized produce. The overall arrangement of the positioned and supported tiers of palletized produce, the tarps, the interior wall structure and the walls, ceiling and floor of the chamber provides an advantageous forced cool air circulation directly through the openings formed in the sides of the two tiers of the unitized and palletized produce to obtain a substantially uniform, controlled temperature, air circulation throughout the inserted produce load.

Significantly, the frame structure permits the stacking of a second tier of palletized produce within the ripening room to substantially increase the total amount of produce Which may be processed for a given amount of floor space. Pursuant to an important feature of the invention, the frame structure includes seal forming members disposed between the lower and upper tiers of the palletized produce and extending the full length of the produce load on each side thereof. The seal forming members block off and seal the side spaces between the top of the first tier boxes and the pallets of the upper tier of palletized produce. Accordingly, the seal forming members, together with the tarps and false wall provide a maximum forced air circulation flow entirely through the boxes. This arrangement provides a most efficient and accurate control over the temperature of the entire produce load while minimizing the total energy required by the air handling unit and exhaust blowers to achieve the desired temperature condition. Moreover, the arrangement of the invention so as to accommodate a palletized produce load greatly facilitates handling of the produce by minimizing the number of handling steps required to load and unload the produce to and from the ripening chamber.

For a better understanding of the above and other features of the invention, reference should be made to the following detailed description and to the accompanying drawings.

DETAILED DESCRIPTION

Figure 1:
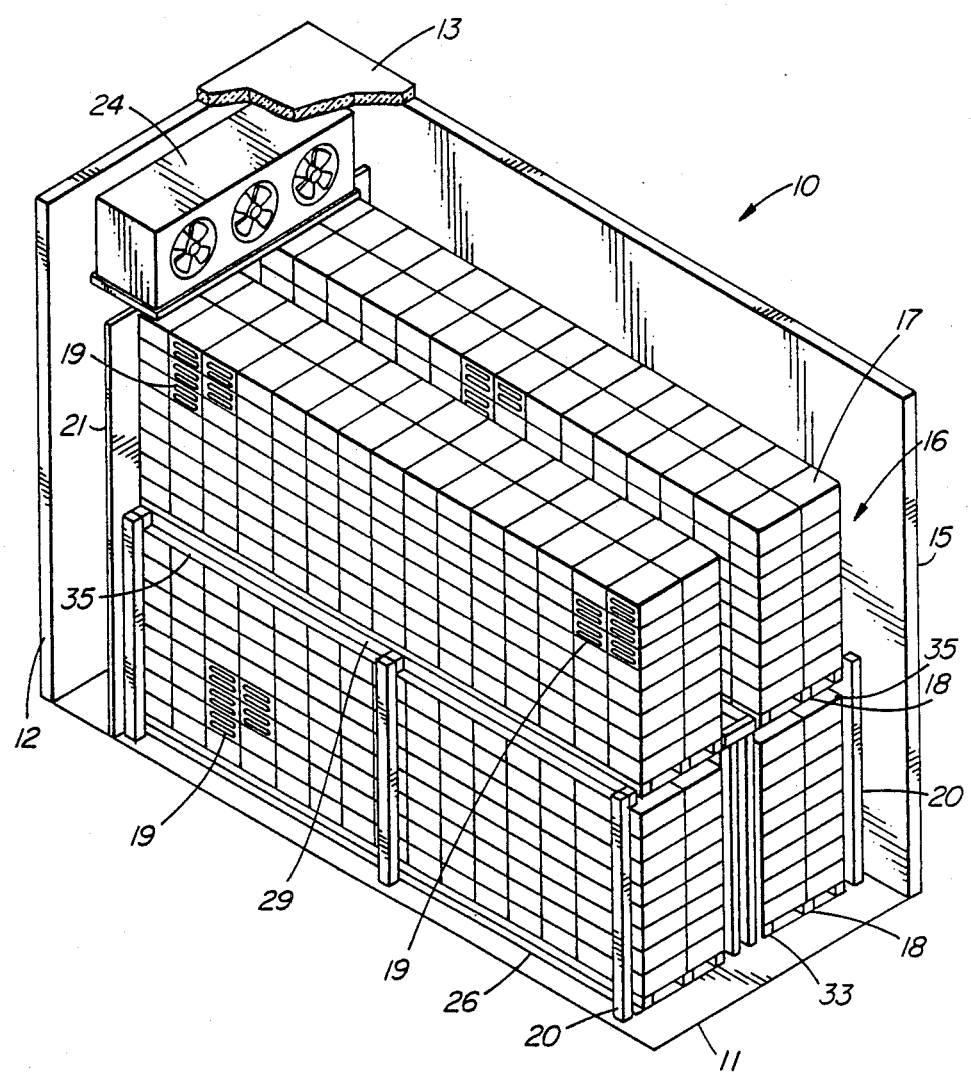
FIG. 1 is a perspective view of a ripening room in accordance with the invention with parts of the walls broken away to illustrate the arrangement of a unitized, palletized produce load arranged within the room.
Figure 2:
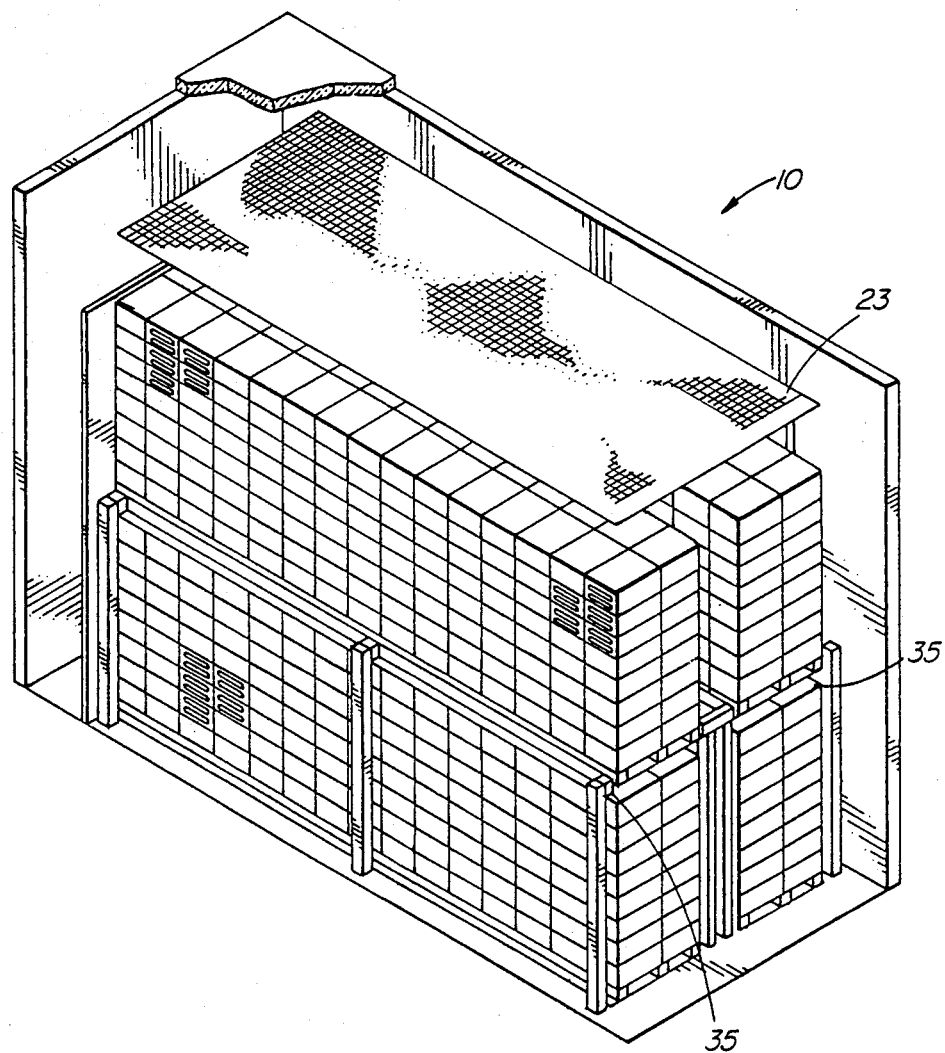
FIGS. 2-5 illustrate the ripening room of FIG. 1 with different arrangements of a ceiling tarp and an end tarp.
Figure 3:
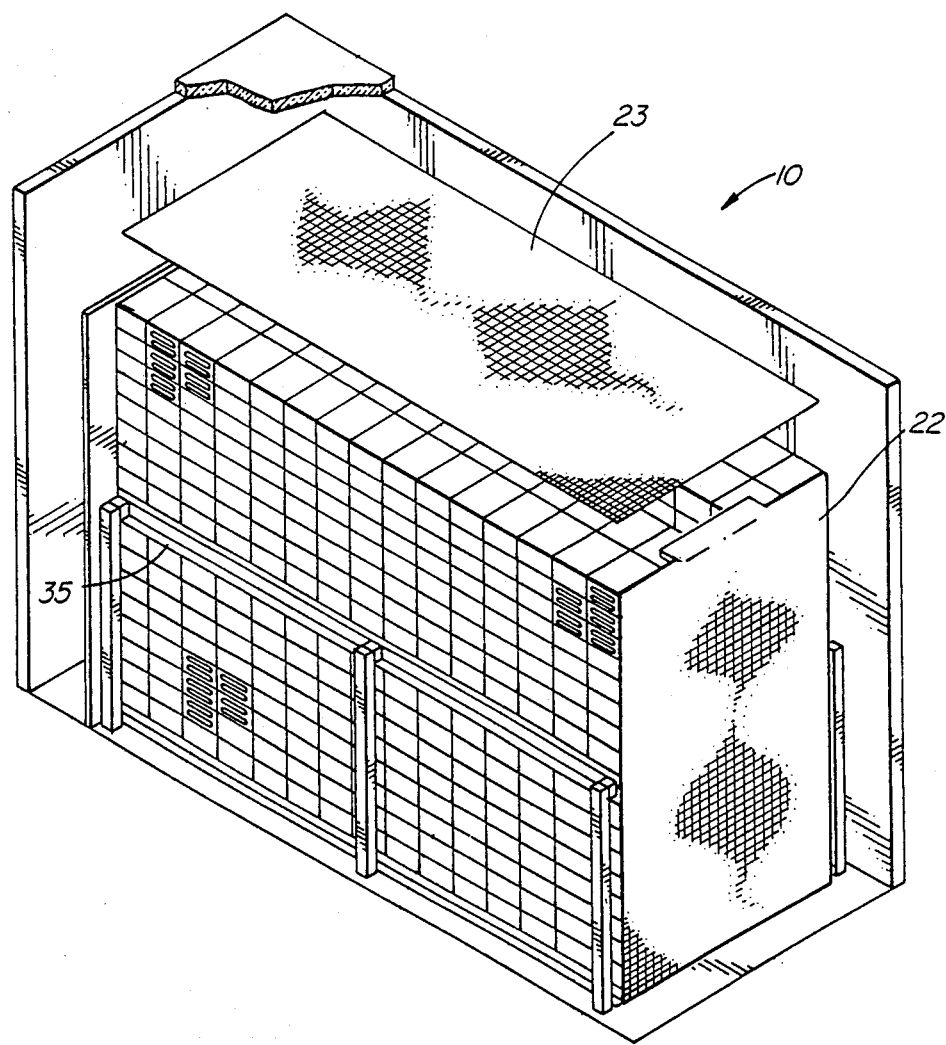
Figure 4:
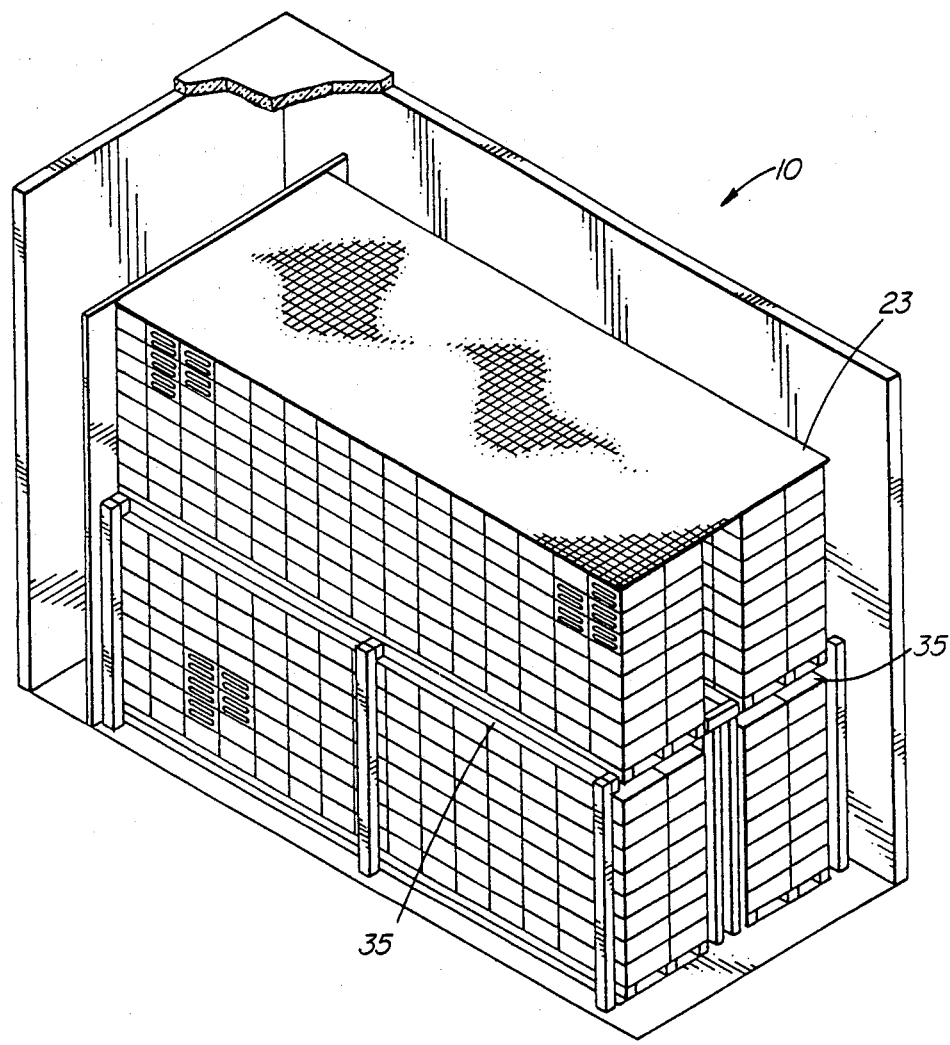
Figure 7:
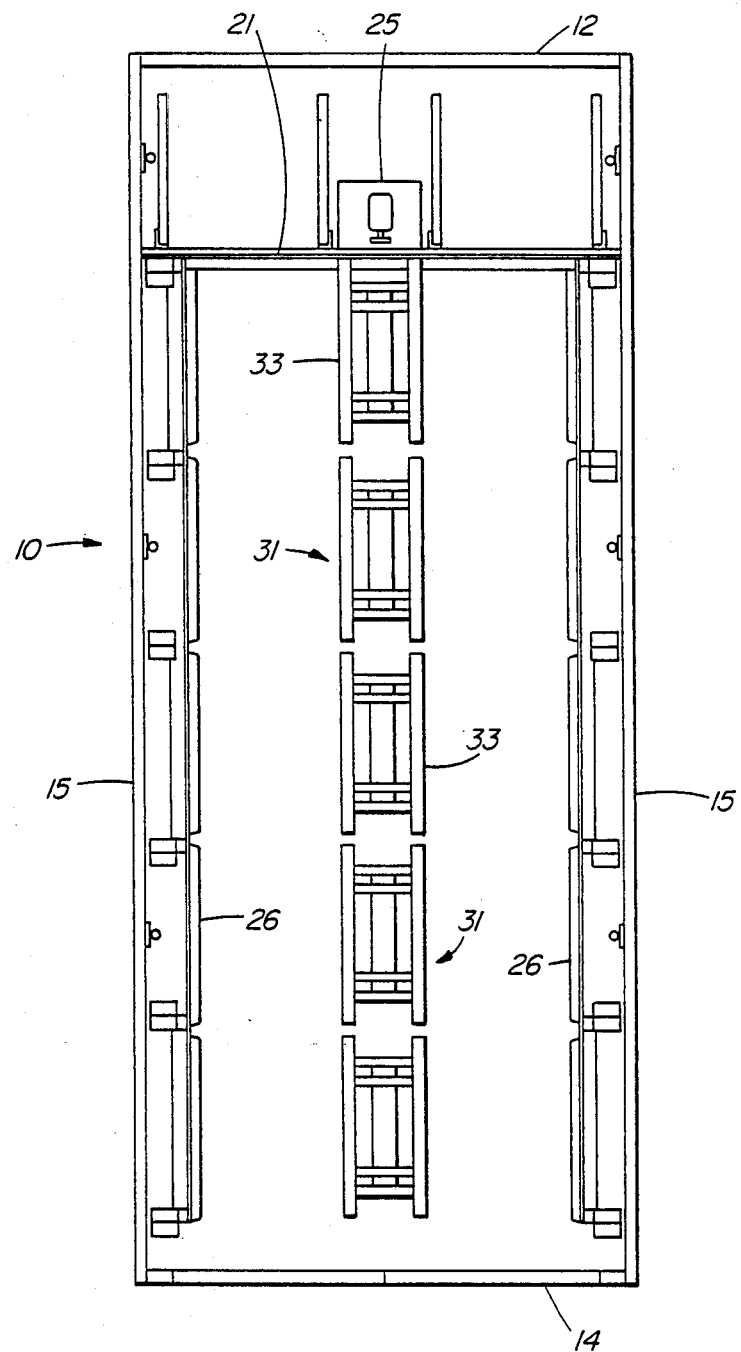
FIG. 7 is a top view of the ripening room taken generally along line A—A of FIG. 6.

Referring now to the drawings and initially to Fig. 1, there is illustrated a ripening room according to the invention and generally indicated by the reference numeral 10. The ripening room 10 includes a floor 11, rear wall 12, ceiling 13, a removable front panel 14 (see FIG. 7) and side walls 15 (see FIG. 7). The walls, front panel and ceiling 12, 13, 14, 15 are insulated and form a generally gas tight chamber for the treatment of produce, as will appear. The overall dimensions of the ripening room 10 are suitable to house two, two-tiered rows of palletized produce 16 and may be, for example, approximately a height of 17', a width of 10' and a length of 25'. The removable front panel 14 is removed to insert or remove the produce load, as required.

Each unit of palletized produce 16 comprises a plurality of protective boxes 17 to unitize and protect the produce. The protective boxes 17 are block-stacked on pallets 18 for easy handling during the insertion and removal of the produce load to and from the ripening room 10. Each pallet 18 may be 40"×48" with 48 protective boxes 17 block-stacked thereon. Pursuant to the invention, each of the protective boxes 17 includes side openings 19 WhiCh register with similar openings in adjacent boxes 19 to facilitate air flow through the boxes 19.

Figure 8:
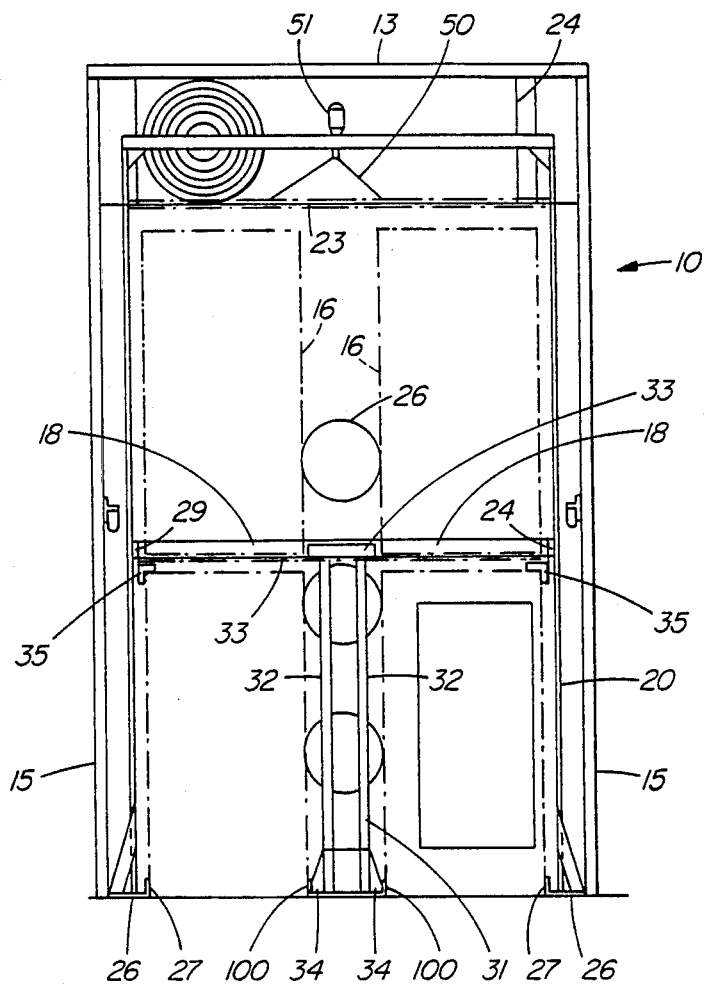
FIG. 8 is an end view of the ripening room taken generally along line B—B of FIG. 6.

As clearly illustrated in FIGS. 1 & 8, a metal frame structure 20 is provided to position the palletized produce within the ripening room 10 into two spaced rows, each having two tiers of pallets 18, to provide a spacing between the rows of, for example, 18". The frame structure 20 is also arranged to register one end of the palletized produce 16 against a false wall 21. More specifically, the frame structure 20 includes a pair of generally L-shaped members 26 extending longitudinally along a substantial section of the length of the ripening room 10 along the floor 11 at each side thereof. A vertical leg 27 of each of the L-shaped members 26 is spaced inwardly from the adjacent side wall 15 a predetermined distance such as, e.g., 11", to define guide surfaces to engage and thereby space the pallets 18 of the lower tier from the walls 15. The vertical legs 27 are of sufficient height to seal off the lower pallets 18 from air flow therethrough.

A plurality of vertical support columns 28 are spaced throughout the length of the ripening room 10 at each side to secure the L-shaped members 26 as well as to mount support rails 29 to engage and support the outer periphery of the pallets 18 of each row of the upper tier of the palletized produce 16.

A series of cross beams 30 and horizontal beams 30' are secured to the vertical support columns 28 to provide structural integrity to the frame structure 20. Arranged midway between the vertical support columns 28, generally at the center line of the length of the ripening room 10 are a series of support frames 31 (see FIGS. 7 & 8) comprising additional vertical support columns 32 to securely mount rails 33 and L-shaped members 34. The L-shaped members 34 include vertical legs 100 which cooperate with the legs 27 to guide the lower tier pallets 18 into the two spaced rows. The rails 33 are arranged to engage and support the inner periphery of the pallets 18 such that each of the second tier pallets 18 are supported by the rails 29, 33 directly above the lower tier pallet 18 in two, two-tiered rows.

Each of the rails 29, 33 includes vertical sections of a sufficient height to seal off the upper pallets 18 from air flow therethrough. Moreover, pursuant to a significant feature of the invention, a longitudinally extending sealing strip 35 is formed as a downward extension of each rail 29 to block air flow from the outside of the palletized produce load 16 to between the pallets 18 of the upper tier and the tops of the protective boxes 17 of the lower tier.

Figure 5:
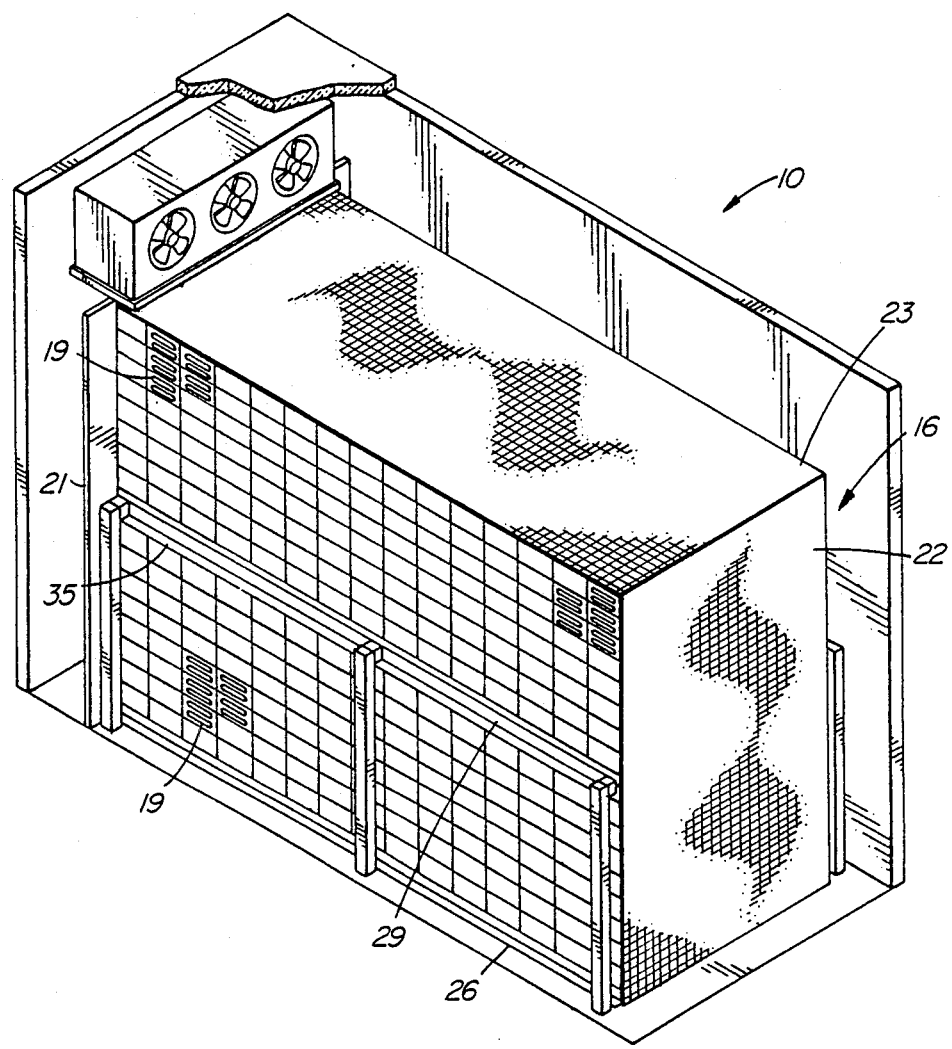
Figure 6:
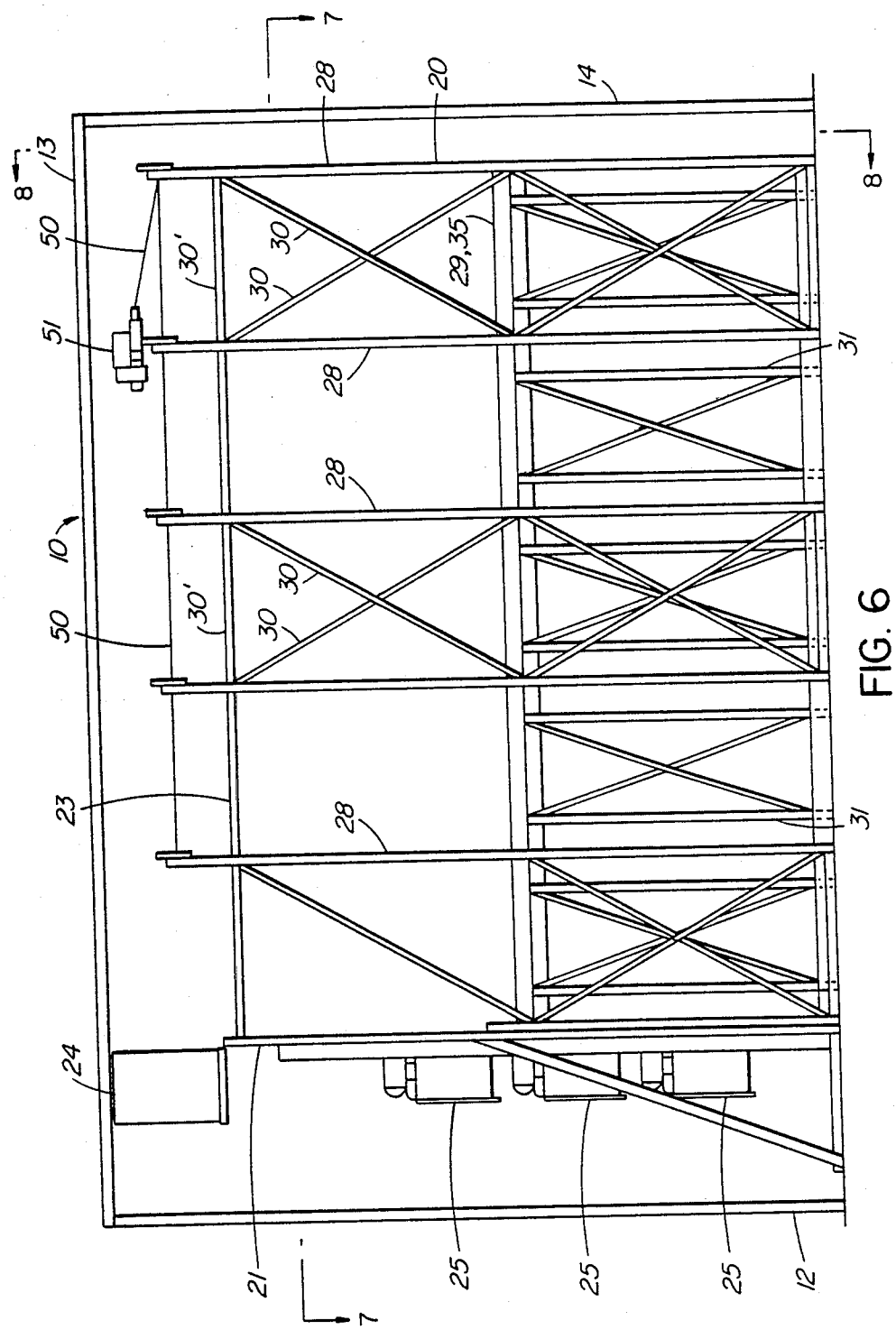
FIG. 6 is a side view of the ripening room of Fig. 1 and illustrating details of the frame structure for positioning and supporting the palletized produce.

Referring now to FIGS. 2-5, an end tarp 22 and a ceiling tarp 23 are removably conformed to the top and the other end of the palletized produce 16 to, together with the false wall 21, the vertical sections of the rails 26, 29 and the sealing strips 35, seal the top and ends of the palletized produce 16 as well as the spacing therebetween and thereby define a sealed intersitial volume between the rows (see Fig. 5). In the illustrated embodiment of the invention, the ceiling tarp 23 is suspended from a cable and pully system 50 which is operatively associated with a drive motor 51 such that the ceiling tarp 23 may be raised and lowered onto and from the top of the palletized load 16, when and as required. This arrangement facilitates an easy loading and unloading of the produce load. The support frames 31 are also arranged to be of the height of the supported pallets 18 of the second tier so as to not interfere with the lifting and lowering of the ceiling tarp 23.

Pursuant to the invention, the false wall 21 is arranged to support an air handling unit 24 and exhaust blowers 25. The exhaust blowers 25 are axially aligned along the center of the false wall 21 and register with openings 26 (Fig. 8) formed in the false wall 21. The openings 26 open to the intersitial volume defined by the tarps 22, 23, the false wall 21 and the two spaced rows of palletized produce 16. In this manner, the exhaust blowers 25 are operable to exhaust the air within the intersitial volume between the rows of palletized produce and thereby create a low pressure plenum between the rows of palletized produce which is at a lower pressure than the remaining space of the ripening room 10. The air handling unit 24 is operable to introduce a controlled flow of air into the spacing between the ceiling 13 and the ceiling tarp 23. The pressure differential caused by the operation of the exhaust blowers 25 forces the introduced air to circulate through the openings 19 of the protective boxes 17, around the produce contained therein and into the sealed spacing between the two, two-tiered rows of palletized produce 16 for exhaustion by the blowers 25.

Due to the arrangement of the tarps 22, 23 and the pallet side sealing effects of the vertical sections of the rails 26, 29 and the sealing strips 35, all of the forced air flow caused by the pressure differential flows uniformly through the openings 19 of the protective boxes 17 and accordingly, around the produce contained therein. This insures a maximum utilization of the pressure drop to uniformly circulate air throughout the produce load with a most efficient operation of the air handling unit 24 and the exhaust blowers 25. In one embodiment of the invention, a Krack DT3C 595 evaporator is used as the air handling unit 24 and three 1½ horse power 4000 cfm at ¾" static pressure fans are used as the exhaust blowers 25. It has also been found that two 2 horse power fans may be used instead of the three 1½ horse power fans.

The present invention therefore provides a highly advantageous improvement in pressurized ripening systems. The frame structure permits two tiers of palletized produce to be arranged within the room to substantially increase the total amount of produce which may be processed for the given square footage of the facility within which the ripening room is arranged. The configuration of the frame structure, including the guide rails and sealing strips, provides an advantageous arrangement to properly position the produce load and to cause all air circulation to occur uniformly through the boxes without pressure leaks through the pallets or through the spacing between the two tiers. The resulting forced circulation through the boxes is therefore controllable to uniformly and accurately control the temperature of the produce load to within a minimal temperature range, e.g., ±1° throughout the produce load. Moreover, the teachings of the present invention may be economically implemented by converting existing one tier ripening rooms or open space two tier systems into the two-tier pressurized system of the invention. The present invention is ideally suited to the pressurized ripening of bananas.

What is claimed is:

1. An apparatus for controlled, pressurized ripening of fresh produce, which comprises:
   (a) a chamber having a ceiling and front, rear and side walls;
   (b) a frame structure arranged within said chamber to position and support two rows of palletized produce, each of said two rows including two vertically spaced tiers of palletized produce, said two rows being spaced apart by said frame structure to define an intersitial volume therebetween, and said two rows being further spaced by said frame structure from the walls and ceiling of said chamber to define a fluid circulation space around said palletized produce;
   (c) sealing means to seal said intersitial volume from said fluid circulation space;
   (d) said frame structure including sealing members to seal said vertical space between said two-tiers from fluid circulation therethrough; and
   (e) fluid control means to exhaust fluid from said intersitial volume and to introduce a controlled fluid flow into said fluid circulation space;
   (f) whereby to create a pressure differential between said intersitial space and said fluid circulation space such that said introduced controlled fluid is forced to flow uniformly through said palletized produce.

2. The apparatus of claim 1 wherein said fluid control means comprises an air handling unit to introduce controlled air into said fluid circulation space and exhaust fans to exhaust fluid from said intesitial volume.

3. The apparatus of claim 1, wherein said palletized produce comprises individual protective boxes of produce being block-stacked on pallets.

4. The apparatus of claim 3, wherein each of said protective boxes includes side openings to permit air circulation therethrough.

5. The apparatus of claim 4 wherein the side openings of adjacent protective boxes of said block-stack are registered with one another.

6. The apparatus of claim 1 wherein said sealing members comprise longitudinally extending strips disposed between the vertically spaced tiers of palletized produce on either outer side thereof.

7. The apparatus of claim 1 wherein said sealing means comprises an end tarp conformed to one end of said palletized produce and a ceiling tarp conformed to the top of said palletized produce.

8. The apparatus of claim 1 wherein said frame structure comprises longitudinally extending guide rails to guide and position a first set of two lower rows of palletized produce and longitudinally extending support rails to guide and support a second set of two upper rows of palletized produce vertically spaced above said first set of two lower rows.

9. The apparatus of claim 8 wherein said guide rails and support rails position said palletized produce into said first and second sets of rows to define an intersitial volume therebetween and a fluid circulation space around the outside of said palletized produce.

10. The apparatus of claim 2 and further a false wall arranged in a spaced relation from the rear wall of said chamber.

11. The apparatus of claim 10 wherein said false wall supports said air handling unit adjacent said ceiling and said exhaust fans in a sealed relation to said intersitial volume.

12. The apparatus of claim 1 wherein said front wall is removable.

13. The apparatus of claim 2 wherein the air handling unit comprises an air temperature control unit and an air flow control unit.

14. The apparatus of claim 7 wherein the ceiling tarp is connected to an automatic cable and pully system including a drive motor to automatically raise and lower the ceiling tarp from and onto the top of the palletized produce.

15. An apparatus for controlled, pressurized ripening of fresh produce, which comprises:
 (a) a chamber having a ceiling and front, rear and side walls;
 (b) support and positioning means to position and support two rows of vertically spaced upper and lower tiers of palletized produce within said chamber and spaced from the ceiling and front, rear and side walls to define a fluid circulation space around said palletized produce;
 (c) said support and positioning means further positioning said produce load into two spaced rows to define an intersitial volume therebetween;
 (d) sealing means to seal said intersitial volume from said fluid circulation space and to seal the vertical spacing between said vertically spaced upper and lower tiers of palletized produce; and
 (e) fluid control means to exhaust fluid from said intersitial volume and to introduce a controlled fluid into said fluid circulation space to create a pressure differential between said intersitial volume and said circulation space to thereby force said introduced controlled fluid to flow uniformly through said palletized produce.

16. The apparatus of claim 15 wherein said support and positioning means comprises a frame structure.

17. The apparatus of claim 16 wherein said frame structure includes side sealing members to block fluid flow through the vertical spacing between said vertically spaced upper and lower tiers of palletized produce.

18. The apparatus of claim 15 wherein said palletized produce comprises individual protective boxes, each containing produce, said protective boxes being block-stacked on pallets.

19. The apparatus of claim 18 wherein said sealing means includes means for blocking fluid flow through said pallets.

20. A method for controllably ripening fresh produce comprising the steps of:
 (a) inserting a load of palletized produce into a chamber having a ceiling and front, rear and side walls;
 (b) arranging and supporting said palletized produce into two rows each of two vertically spaced tiers;
 (c) further arranging said two rows to be spaced from one another to define an intersitial volume therebetween and to be spaced from said ceiling and side walls to define a fluid circulation space around said load of palletized produce;
 (d) sealing said intersitial volume from said fluid circulation space about the spacing between said two rows of palletized produce;
 (e) sealing the vertical space between said two tiers of palletized produce to prevent fluid circulation therethrough; and
 (f) thereafter simultaneously introducing controlled fluid into said fluid circulation space and exhausting fluid from said intersitial space to thereby create a pressure differential between said intersitial space and said fluid circulation space such that said introduced, controlled fluid is forced to flow uniformly through said load of palletized produce.

21. The method of claim 20 wherein said fluid is air.

22. The method of claim 20 wherein said palletized produce comprises palletized bananas.

* * * * *